Jan. 23, 1934. O. A. WIBERG 1,944,538
RADIAL FLOW ELASTIC FLUID TURBINE
Filed Feb. 23, 1933
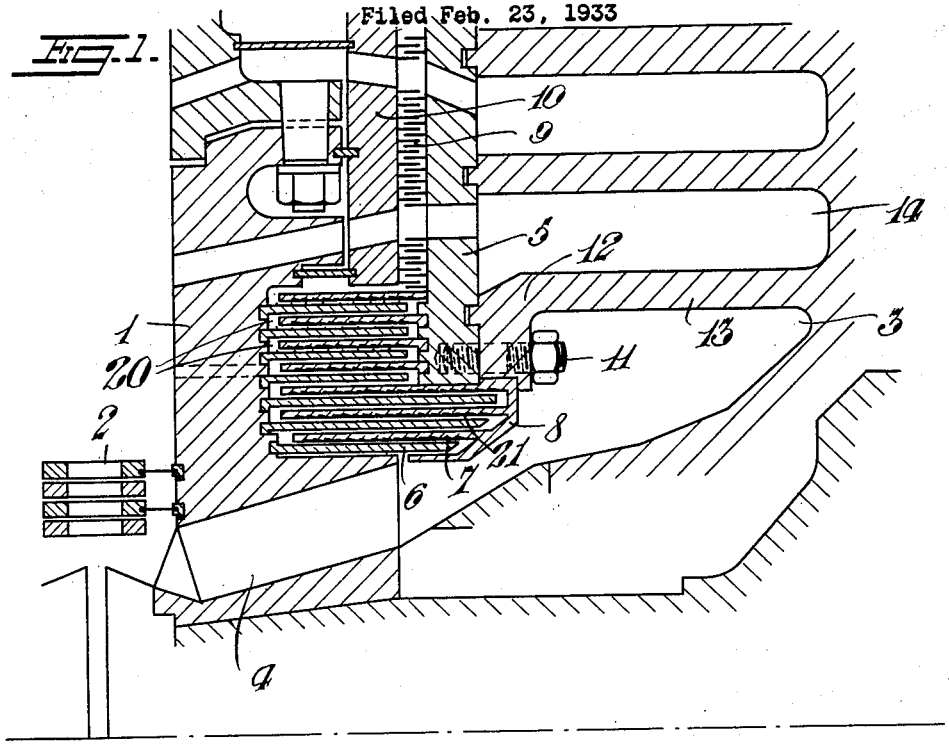
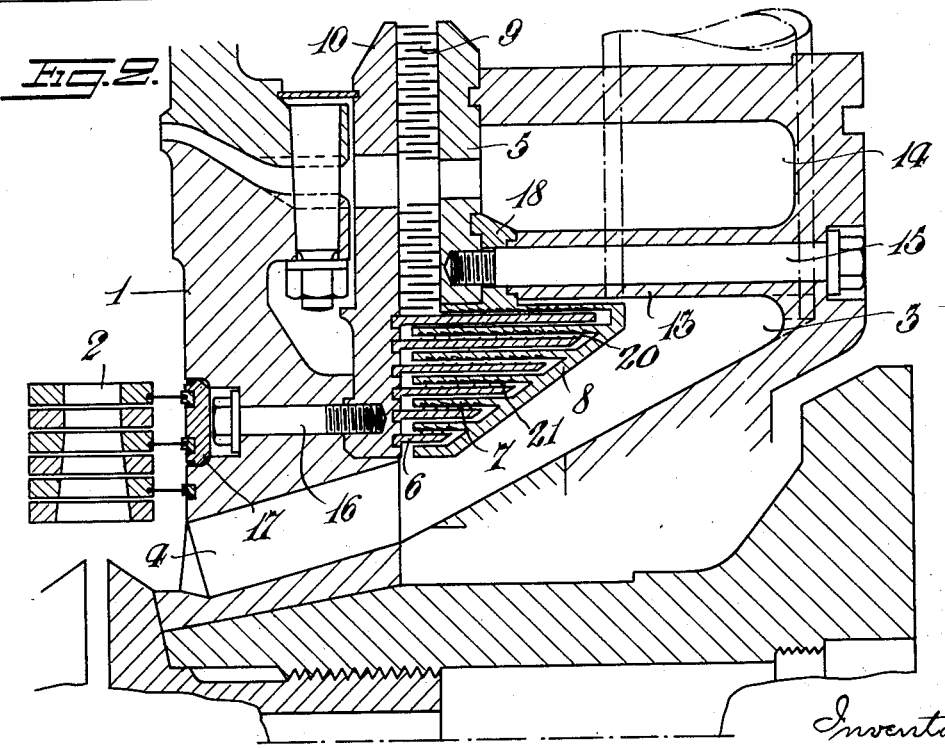
Inventor
Oscar A. Wiberg
By Sommers & Young
Attys.

Patented Jan. 23, 1934

1,944,538

UNITED STATES PATENT OFFICE 1,944,538

RADIAL FLOW ELASTIC FLUID TURBINE

Oscar Anton Wiberg, Finspong, Sweden

Application February 23, 1933, Serial No. 658,203, and in Sweden May 6, 1931

3 Claims. (Cl. 253—16.5)

This invention relates to radial flow elastic fluid turbines and more particularly to the packing devices used in connection with such turbines between a rotary turbine wheel and the distributing chamber for the elastic fluid or, in case of turbines having two wheels rotating in opposite directions, between each such wheel and the respective distributing chamber.

The object of this invention is to provide a packing for this purpose which is more effective than those hitherto known, which is of importance especially in case of turbines driven by an elastic fluid of high pressure.

With this and other objects in view the packing comprises, in part, a labyrinth packing of usual design having a substantially radial leakage passage and, in part, a set of concentric sleeves alternately carried by the turbine wheel or a member connected thereto and by the said distributing chamber or a member connected thereto, the said set of sleeves being surrounded by the said usual packing, so that the sleeves may present within a restricted diameter a long leakage passage for the fluid tending to escape on its way from said distributing chamber to the turbine blading.

In the accompanying drawing, two embodiments of packings according to this invention are illustrated. Fig. 1 is an axial section of part of a radial flow turbine having a packing according to the invention built into the turbine wheel. Fig. 2 is a similar view showing a packing according to the invention as located in the distributing chamber.

With reference to Fig. 1, the numeral 1 indicates a turbine wheel of a radial flow turbine having two wheels rotating in opposite direction. At 2 some of the rings of the blading are indicated. The elastic driving fluid, as steam, is supplied to the blading from the innermost distributing chamber 3 of the steam chest through passages 4 in the turbine wheel. Inserted between the turbine wheel and the end wall 5 of the steam chest facing the turbine wheel is a labyrinth packing. Next to the steam chest this packing consists of a set of sleeves 6, 7 concentric to the turbine axis. The sleeves 6 are carried by the turbine wheel 1 and the sleeves 7 are carried, in part, by the wall 5 and, in part, by a separate casing 8 attached to said wall. The sleeves 6, 7 are of comparatively large axial dimension, so that the packing resulting will show substantially the same appearance as a shaft packing of the labyrinth type. This packing 6, 7 is located substantially in a recess formed in the turbine wheel 1, and only that part of the packing which is represented by the casing and its sleeves projects into the chamber 3 where it affords a part or extension of the inner end wall 5 of the steam chest. The sleeves 6 carried by the turbine wheel 1 may, preferably, be provided with sealing flanges 20 on their outer periphery, which may be attached thereto by a shrinking, while the inner peripheral surfaces of the sleeves 7 may be provided with sealing teeth 21 produced by a turning operation. The sleeves 6 and 7 present a long leakage passage including a large number of constrictions and afford as a result, an effective protection even against the leakage of an elastic fluid, as steam, of very high pressure. Outside the packing 6, 7 there is a labyrinth packing 9 of the hitherto usual design, that is to say, with the sealing elements projecting from two oppositely positioned disks, one of which is represented by the above said inner end wall 5 of the steam chest, while the other 10 is attached to the turbine wheel 1. The connection between the end wall or labyrinth disk 5 and the steam chest is effected in this embodiment by bolts 11 freely extending through borings in a flange 12 of the partition 13 of the steam chest located between the innermost chamber 3 and a surrounding chamber 14, and engaging a threaded boring in the disk 5. Said bolts act at the same time to hold the casing 8 in place, the outer peripheral portion of said casing being clamped between the disk 5 and a shoulder of the flange 12.

In the embodiment shown in Fig. 2, the reference numeral 1 indicates the turbine wheel, 2 is the blading and 3 is the innermost chamber of the steam chest. 4 is one of the steam admission passages leading through the turbine wheel 1 from the chamber 3 to the blading and 5 is the end wall of the steam chest next to the turbine wheel. Similarly as in the embodiment shown in Fig. 1, the packing between the steam chest and the turbine wheel comprises an inner section consisting of sleeve-shaped elements 6, 7 and an outer section 9 of usual design. The packing 6, 7 is located within the steam chamber 3, the packing sleeves 6 projecting from the inwardly extended surface of the rotary disk 10 of the packing 9, while all of the packing sleeves 7 project from the casing 8 located within the steam chamber 3. In this case the location of the packing 6, 7 prevents the use of a flange connection between the steam chest and its inner end wall 5 like that shown in Fig. 1. Even in this case the end wall 5 constitutes the stationary disk of the packing 9. The attachment of the steam chest to the end wall or labyrinth disk 5 is effected by axial bolts 15 freely extending through holes formed in the partition 13 between the innermost chamber or compartment 3 of the steam chest and a surrounding chamber or compartment 14 and screwed into threaded borings formed in the disk 5. Said bolts also act to hold the casing 8 in its place. To this end they also extend through holes in a flange 18 of the casing 8 clamped between the wall 5 and the inner end of the partition 13.

In this embodiment a reliable connection is required between the turbine wheel 1 and that part of the labyrinth disk 10 which carries the sleeves 6. In the drawing this connection is shown as accomplished by axial bolts 16 extending through holes in the turbine wheel and engaging threaded borings in the labyrinth disk 10. To receive the heads of the screw bolts 16 a groove is formed in the surface of the turbine wheel facing the blading, and this groove is covered by an annular piece 17 at the same time serving to carry some of the blade rings, as shown.

It is to be noted, that also other embodiments except those above described are adapted to be included within the scope of the claims.

Instead of an annular groove to receive the heads of the bolts 16 a separate recess may be provided for each individual bolt head.

What I claim is:—

1. In a radial flow elastic fluid turbine, a rotary wheel, an admission chamber for the driving fluid, a separate end wall to bound said chamber on its side facing the turbine wheel, a partition in said chamber having a flange to engage said end wall, axial bolts extending through said flange to connect same to the end wall, a casing clamped between part of said flange and said end wall by the action of said bolts so as to project into said chamber, an outer labyrinth packing having a substantially radially extending leakage passage provided between said end wall and said rotary wheel, and an inner packing in series with said outer packing, said inner packing comprising mutually engaging rotary and stationary axial sleeves, the rotary sleeves being carried by the turbine wheel, and the stationary sleeves being carried, in part at least, by said casing.

2. In a radial flow elastic fluid turbine, a rotary wheel, an admission chamber for the driving fluid, a separate end wall to bound said chamber on its side facing the turbine wheel, an axial partition in said chamber, axial bolts extending through said partition and engaging said end wall so as to connect the end wall to the partition, a casing having a flange clamped between said partition and said end wall so as to project into the chamber, an outer labyrinth packing including a rotary disk secured to said rotary wheel and a non-rotary disk represented by said end wall, and an inner packing surrounded by said outer packing so as to be in series therewith, said inner packing comprising mutually engaging rotary and non-rotary axial sleeves, the rotary sleeves being carried by the rotary disk of said labyrinth packing and the non-rotary sleeves being carried by said casing.

3. In a radial flow elastic fluid turbine, a rotary wheel, and admission chamber for the driving fluid, a separate end wall to bound said chamber on its side facing the turbine wheel, an axial partition in said chamber, axial bolts extending through said partition and engaging said end wall so as to connect the end wall to the partition, a casing having a flange clamped between said partition and said end wall so as to project into the chamber, a disk carried by the rotary wheel opposite said end wall, axial bolts extending through said wheel to secure the said disk thereto, the blade carrying surface of the wheel having a recess or recesses to receive the heads of said bolts, means to cover said recess or recesses, an outer labyrinth packing between said disk and said end wall, and an inner packing surrounded by said outer packing so as to be in series therewith, said inner packing comprising mutually engaging rotary and non-rotary axial sleeves, the rotary sleeves being carried by said disk and the non-rotary sleeves being carried by said casing.

OSCAR ANTON WIBERG.